Nov. 23, 1926.　　　　　　　1,608,002
E. G. ROWLEY
AUTOMOBILE SIGNAL
Filed August 27, 1925　　　2 Sheets-Sheet 1
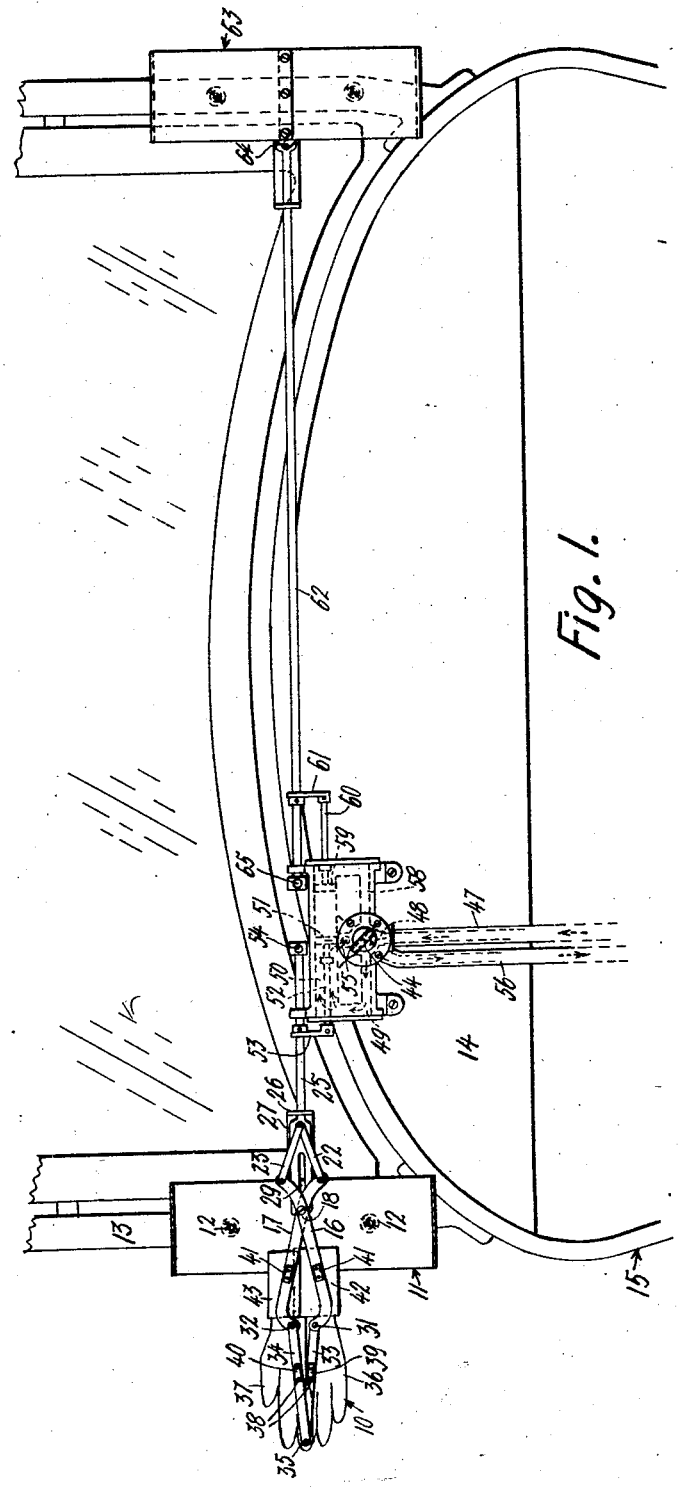
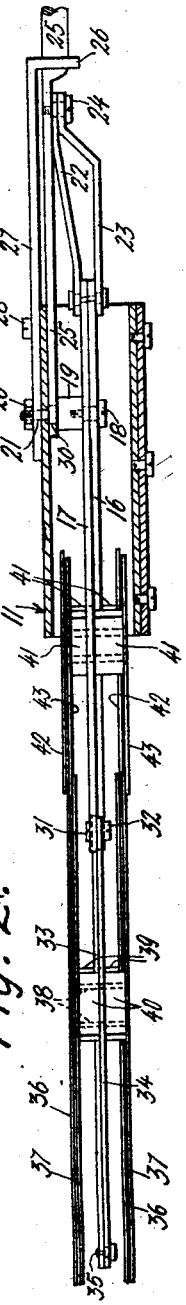
Inventor:
Edward G. Rowley
by B C Stickney
Attorney Nov. 23, 1926. 1,608,002
E. G. ROWLEY
AUTOMOBILE SIGNAL
Filed August 27, 1925 2 Sheets-Sheet 2
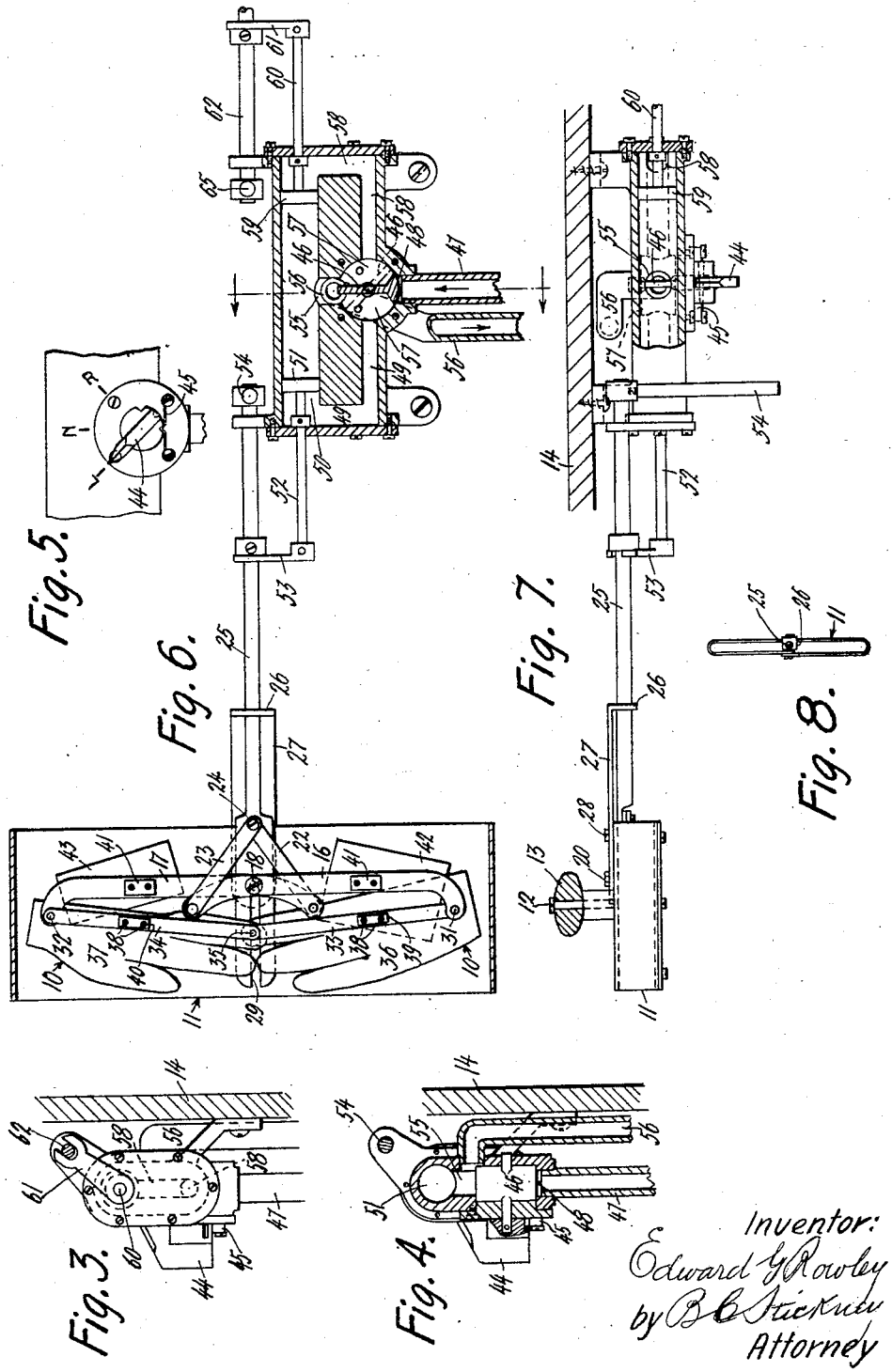
Inventor:
Edward G Rowley
by B C Stickney
Attorney Patented Nov. 23, 1926.

1,608,002

UNITED STATES PATENT OFFICE.

EDWARD G. ROWLEY, OF BELLEVILLE, NEW JERSEY.

AUTOMOBILE SIGNAL.

Application filed August 27, 1925. Serial No. 52,848.

This invention relates to devices for use in automobiles for signaling to the driver of the car in the rear, and discloses novel means for operating such signals by power, and also an improved construction of the signal.

The improved signal has the form of a human hand, and is folded out of use within a casing that is mounted in the car. The projection of the device from the car is effected by a linkage, resembling lazy-tongs. The signal hand is made in upper and lower sections pivoted to each other and closing together to form a unitary hand; said sections being, for this purpose, secured to the outer pivoted links or members of the lazy-tongs.

The signal may be operated by a rod extending from the casing to the interior of the car and provided at its inner end with a handle which can be grasped by the driver. A similar signal may be used at the other side of the car, and may be operated by a similar rod and handle, the handles being adjacent each other for convenience of manipulation.

To operate the signals by power, there may be provided a connection to the exhaust pipe of the automobile engine, the point of connection being between the engine and the usual muffler, and also a connection to the intake manifold between the engine and the carbureter. The exhaust is caused to operate either one or both of two driving pistons, which are connected, respectively, to the thrust rods of the signals. The controlling valve admits the engine exhaust to either piston to operate the same.

Other features and advantages will hereinafter appear.

In the accompanying drawings,

Figure 1 is an elevation of a dash-board of an automobile, showing one signal projected by power, and the other as confined in its casing.

Figure 2 is a sectional plan, through the casing and the signal, showing the signal extended, and on a larger scale than Figure 1.

Figure 3 is a side elevation of the power device for operating the signal, the dash being shown in section as well as the signal-operating rod.

Figure 4 is a sectional view of the device seen at Figure 3.

Figure 5 is a front elevation of the controller for the power drive, said controller set to cause the left-hand signal to be projected.

Figure 6 is a front sectional elevation of the signaling device and the power-projecting mechanism.

Figure 7 is a sectional plan of the parts seen in Figure 6.

Figure 8 is a detail of the casing in which the signal is normally housed.

The signal hand 10, seen projected at Figure 1, is foldable within a casing 11 that is secured by screws 12 upon the wind-shield standard 13, rising from the dash 14 of the automobile 15. The lazy-tongs arrangement comprises a pair of lever arms 16, 17, pivoted together upon a stationary bearing 18, which may be in the form of a shouldered screw threaded into a stud 19, Figure 2, which is held to the back of the casing 11 by means of a nut 20 threaded onto a shank 21 formed on the stud. These levers are vibrated from the closed position at Figure 6 to the open position at Figure 1, by means of links 22, 23 pivoted at 24 to an operating rod 25. This thrust rod slides in a guide having the form of an ear 26 provided upon a bracket 27, which is secured to the back of the casing 11, partly by means of a screw 28 and partly by means of said nut 20. The end of said rod 25 is slotted at 29, whereby it is guided upon a shoulder 30 formed upon the stud 19.

Said lazy-tong levers 16, 17 at their outer ends are pivoted at 31, 32 to links 33, 34, completing the lazy-tongs, said links being articulated together at their ends at 35; the folded position of the lazy-tongs being seen at Figure 6.

The signal hand is made up of two finger-sections 36, 37, each section carrying three fingers, the third finger of one section being coincident with or behind the third finger of the other section, thus giving the appearance of a single finger when projected at Figure 1.

Two complete hands are preferably used for each signal, each of said complete hands formed of two finger-sections; and the lazy-tongs are placed between the hands and concealed from view thereby. To the link 33 are secured two similar hand-sections face to face by means of rivets 38 which fasten the hand-sections to a block 39, which spaces the hand-sections apart. To the link 34 are secured the two remaining hand-sections face to face by means of similar rivets 38 and a spacer-block 40. The hand-sections therefore partake of the movements of the links, closing up when the toggle is extended and separating when the toggle is folded.

Cuff-sections 42, 43 are similarly connected or riveted by blocks 41 to the links 16, 17 the cuff-sections being duplicated, and being extended to cover the wrist and giving a substantial appearance to the signal, as at Figure 1. These cuff-sections fold up compactly within the hand-sections, as at Figure 1. The lazy-tongs include the pair of levers or links 16 and 17, to which the cuff-sections are riveted, and the pair of links 33, 34, which at their inner ends are pivoted to the levers 16 and 17 and at their outer ends are pivoted together, and which also carry the folding hand-sections. At the withdrawing movement into the casing 11, the hand sections spread open, while the wrist-sections fold within the hand-sections. At the extended position, Figure 1, the hand-sections are brought together, while the wrist or cuff sections are unfolded from the hand-sections and are also brought together. Thus instead of being pivoted directly to each other, the hand and wrist sections rest upon a concealed folding framework, giving it a superior effect.

When it is desired to operate the left-hand signal by power, an index 44 is moved from vertical neutral position, where it is normally held by a spring-detent 45, Figure 5, to the point marked "L" or "left". This pointer is fixed on a valve 46, which turns from the full-line position to the dotted-line position at Figure 6, and this opens a feed pipe 47 from the engine exhaust, and permits the gas under pressure to enter a port 48 and to pass through an elbow passage 49 into a cylinder 50, thereby driving to the right a piston 51 which is fitted in said cylinder and operates a piston rod 52, which, by means of a lug 53, is connected to the pull rod 25. Piston 51, in moving to the right, pulls the rod 25, and extends the toggle and hence displays the left-hand signal. Upon the rod 25 may also be provided a handle 54, for operating the device in either direction by hand when desired.

When the cylinder reaches the end of the stroke to which it is forced by the gas, it advances past an exhaust port 55 placed in one end of the cylinder, which opens into an exhaust pipe 56, through which the gas escapes to the atmosphere. The parts are returned to normal positions by the handle 54, which may also be used for displaying the signal when desired. The pointer 44 may be returned to neutral full-line position at Figure 6, thereby closing the porting 48, before operating the handle 54 to withdraw the signal. When the piston 51 is thus being returned by means of the handle 54, the gas trapped in the passage 49 may pass into valve chamber 57, and by this means escape into the exhaust pipe 56.

When the index 44 is turned to the right, to cause the automatic projection of the signal at the right-hand end of the car, the valve 46 turns to the right, thus opening the port 48 and permitting the gas to flow through elbow passage 58 to operate piston 59, thus driving piston rod 60, lug 61 and rod 62 to the left; said rod 62 corresponding to 25, and cooperating with the right-hand signal, which corresponds to the left-hand signal seen at Figure 6. The right-hand signal is enclosed in a casing 63 similar to 11, the signal including a linkage 64, which is similar to 22, 23, etc., and carries similar hand and wrist sections. At the completion of its left stroke, the piston 59 passes by the exhaust port 55, thus permitting the gas to escape through pipe 56. Then the driver turns the index 44 back to vertical or neutral position, thus closing the port 48. Then by means of a handle 65 on rod 62 he thrusts the rod to the right, together with the piston 59, and pulls in the signal. The gas that is trapped in the passage 58 passes through the valve chamber and out through the pipe 56.

Variations may be resorted to within the scope of the invention, and portions of the improvements may be used without others.

Having thus described my invention, I claim:

1. An automobile signaling device having the form of a human hand and built up of parts foldable out of use, a casing mounted in the car within which the hand is folded, the signal being in the form of sections spread open but pivoted to each other and closing together to form a hand, a lazy-tongs for projecting said hand; said sections being secured to the outer portions of said lazy-tongs, an operating rod extending from said lazy-tongs to the interior of the car, and a handle for said rod.

2. In an automobile signaling device the combination of a pair of lever arms, a bearing upon which they are pivoted together, means for swinging said arms, links pivoted to the outer ends of said arms, said links pivoted together at their tips, thereby forming lazy-tongs, and a signal device made up of two spread-apart finger-sections, one attached to one of said links, and the other attached to the other of said links, so that by extending the lazy-tongs said sections are brought together to form a hand.

3. In an automobile signaling device, the combination of a pair of lever arms, a bearing upon which they are pivoted together, means for swinging said arms, links pivoted to the outer ends of said arms, said links pivoted together at their tips, thereby forming lazy-tongs, a signal device made up of two spread-apart finger-sections, one attached to one of said links, and the other attached to the other of said links, so that by extending the lazy-tongs said sections are brought together to form a hand, and spread-apart cuff-sections upon said levers, said cuff-sections brought together by the movement of said levers at the extension of said lazy-tongs to form a wrist.

4. In an automobile signaling device, the combination of a pair of lever arms, a bearing upon which they are pivoted together, means for swinging said arms, links pivoted to the outer ends of said arms, said links pivoted together at their tips, thereby forming lazy-tongs, and a signal device made up of two spread-apart finger-sections, one attached to one of said links, and the other attached to the other of said links, so that by extending the lazy-tongs said sections are brought together to form a hand, each hand-section having three fingers, the third finger of one section being in registry with the third finger of the other section when projected.

5. In an automobile signaling device, the combination of a pair of lever arms, a bearing upon which they are pivoted together, means for swinging said arms, links pivoted to the outer ends of said arms, said links pivoted together at their tips, thereby forming lazy-tongs, a signal device made up of two spread-apart finger-sections, one attached to one of said links, and the other attached to the other of said links, so that by extending the lazy-tongs said sections are brought together to form a hand, an operating rod, links extending from said operating rod to said levers to extend and withdraw the signal, and means for guiding said rod.

6. In an automobile signaling device, the combination of a pair of lever arms, a bearing upon which they are pivoted together, means for swinging said arms, links pivoted to the outer ends of said arms, said links pivoted together at their tips, thereby forming lazy-tongs, a signal device made up of two-spread-apart finger-sections, one attached to one of said links, and the other attached to the other of said links, so that by extending the lazy-tongs said sections are brought together to form a hand, and a housing in which said levers are pivoted, said housing containing the hand-sections when the signal device is folded.

7. In an automobile signaling device, the combination of a pair of lever arms, a bearing upon which they are pivoted together, means for swinging said arms, links pivoted to the outer ends of said arms, said links pivoted together at their tips, thereby forming lazy-tongs, and a signal device made up of two-spread-apart finger-sections, one attached to one of said links, and the other attached to the other of said links, so that by extending the lazy-tongs said sections are brought together, said signaling device including two complete hands, and the lazy-tongs being placed between the hands and concealed from view thereby.

8. In an automobile signaling device, the combination of a pair of lever arms, a bearing upon which they are pivoted together, means for swinging said arms, links pivoted to the outer ends of said arms, said links pivoted together at their tips, thereby forming lazy-tongs, and a signal device made up of two spread-apart finger sections, one attached to one of said links, and the other attached to the other of said links, so that by extending the lazy-tongs said sections are brought together, said signaling device including two complete hands, and the lazy-tongs being placed between the hands and concealed from view thereby, the links being secured to the hand-sections by means of spacing blocks, whereby the hand-sections partake of the movements of the links, closing up when the lazy-tongs are extended and opening when the lazy-tongs are folded.

9. In an automobile signaling device, the combination of a pair of lever arms, a bearing upon which they are pivoted together, means for swinging said arms, links pivoted to the outer ends of said arms, said links pivoted together at their tips, thereby forming lazy-tongs, and a signal device made up of two spread-apart finger-sections, one attached to one of said links, and the other attached to the other of said links, so that by extending the lazy-tongs said sections are brought together, said signaling device including two complete hands, and the lazy-tongs being placed between the hands and concealed from view thereby, the links being secured to the hand-sections by means of spacing blocks, whereby the hand-sections partake of the movements of the links, closing up when the lazy-tongs are extended and opening when the lazy-tongs are folded, said cuff-sections being secured by spacing blocks to said levers, and folding up within the hand sections.

10. A signaling device including hand-sections and cuff-sections and a folding framework concealed by said sections and means attaching the several sections to the several members of the folding framework, said cuff-sections being foldable relatively to said hand-sections.

EDWARD G. ROWLEY.